United States Patent [19]

Lee et al.

[11] Patent Number: 4,689,760
[45] Date of Patent: Aug. 25, 1987

[54] DIGITAL TONE DECODER AND METHOD OF DECODING TONES USING LINEAR PREDICTION CODING

[75] Inventors: Chin-hui Lee; David Y. Wong, both of Santa Barbara, Calif.

[73] Assignee: Digital Sound Corporation, Santa Barbara, Calif.

[21] Appl. No.: 670,585

[22] Filed: Nov. 9, 1984

[51] Int. Cl.⁴ .................... G06G 7/19; H04M 3/00
[52] U.S. Cl. .................. 370/110.3; 375/94; 381/34; 364/576; 379/386
[58] Field of Search ............... 364/576, 724, 726; 381/51, 34; 375/94, 96; 179/18 EB, 16 EC, 84 VF

[56] References Cited

U.S. PATENT DOCUMENTS

| | | | |
|---|---|---|---|
| 4,223,185 | 9/1980 | Picou | 364/726 X |
| 4,328,398 | 5/1982 | Kawaguchi et al. | 364/724 X |
| 4,354,248 | 10/1982 | Conger et al. | 364/724 |
| 4,379,347 | 4/1983 | Girardi et al. | 375/94 |
| 4,435,832 | 3/1984 | Asada et al. | 381/51 X |
| 4,563,681 | 7/1986 | Godard | 364/724 X |

OTHER PUBLICATIONS

Boddie, J. R., Sachs, N. and Tow, Jr., "Digital Sound Processor: Receiver for Touch-Tone Service," The Bell System Technical Journal, vol. 60, No. 7 (Sep. 1981), pp. 1573–1583.

Mitel, "An Introduction to Mitel DTMF Receivers," application note MSAN-106 (Nov. 1981), pp. 3-3 to 3-9.

Markel and Gray, "Linear Prediction of Speech," Springer-Verlag, (Berlin, Heidelberg, New York 1976), pp. 1–17, 31–35.

V. LeRoux and C. Gueguen, "A Fixed-Point Computation of Partial Correlation Coefficients," *IEEE Trans.* ASSP-25, p. 257, 1977.

*Primary Examiner*—Errol A. Krass
*Assistant Examiner*—Kevin J. Teska
*Attorney, Agent, or Firm*—Bogucki, Scherlacher, Mok & Roth

[57] ABSTRACT

An all digital feature based pattern recognition tone detection system distinguishes one or more tones from speech or other background noise and provides extremely reliable, low cost DTMF tone detection. The system includes a digital signal processing system which uses a modified PARCOR signal analysis technique to efficiently calculate inverse filter coefficients defining in functional form a smoothed LPC spectrum from a received frame of digital pulse code data. A Fourier transform provides high resolution evaluation of the LPC data at frequencies of interest to permit evaluation of the spectral response in accordance with known features of an expected tone signal.

40 Claims, 6 Drawing Figures

FIG. 3
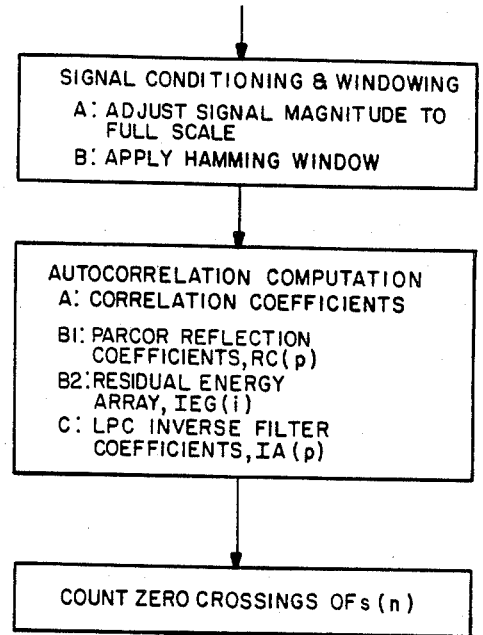
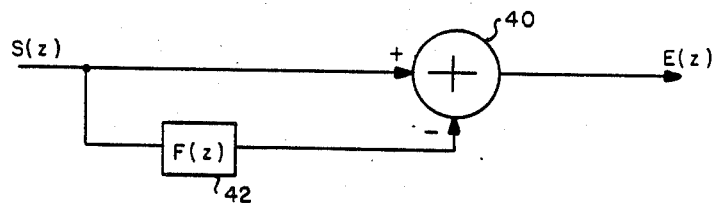
FIG. 4

FIG.5 FIXED POINT PARCOR ALGORITHM-MODIFIED

DIGITAL TONE DECODER AND METHOD OF DECODING TONES USING LINEAR PREDICTION CODING

BACKGROUND OF THE INVENTION

1. Field of the Invention

This invention relates to an apparatus and method for digitally decoding a tone signal and particularly a DTMF telephone dialing signal.

2. Discussion of the Prior Art

In many different applications information is communicated via a signal carrying one or more tones having frequencies within a predetermined set of frequencies. One of the most frequently occurring applications for such signaling is Touch Tone telephone dialing.

Touch Tone dialing uses a dual tone multi-frequency (DTMF) encoding technique in which the predetermined set of frequencies is established with four frequencies in a low band group of frequencies (697, 770, 852 and 941 Hz) and four frequencies in a high band group of frequencies (1209, 1336, 1477 and 1633 Hz). Each different telephone key (or alternatively each different data state or character) is represented by a signal including a unique combination of one tone from the high band and one from the low band. Sixteen different signal states may be represented by this encoding technique.

The traditional decoding technique for a DTMF signal requires the use of analog filters. First, all noise outside the predetermined frequency bands is eliminated and then the signal is separated into a high band group and a low band group of signals. Band pass filters corresponding to the four frequencies in each group are connected to the respective group signals. A different detector is coupled to each band pass filter to determine whether or not the frequency component corresponding to the attached filter is present.

A DTMF tone signal is detected as having a valid signal state when exactly one tone is detected in each signal group for a predetermined minimum time duration. If too many or too few tones are detected the detection criteria is not met and a valid signal state is not indicated. When a valid signal state does occur, the particular combination of tones is decoded to produce an indication of the corresponding key or signal state.

While providing satisfactory operation, analog filters tend to be expensive and bulky, particularly at the relative low frequencies that are typically involved. With the current widespread use of digital signal communication and processing it becomes desirable to substitute digital decoding for the analog filters. Digital decoding becomes particularly desirable when a signal is already represented in digital form. A digital signal is typically divided into fixed length frames, each containing a predetermined number of sample data points. To improve the dynamic range of the sampled signal, either an A-law of a μ-law coding technique may be used to represent the sample signal points.

Boddie, J. R., Sachs, N. and Tow, J., "Digital Signal Processor: Receiver for Touch-Tone Service," *The Bell System Technical Journal*, Vol. 60, No. 7, (September 1981), pp. 1573-1583, describes a digital implementation of a typical analog filter decoder. The digital decoder uses digital filtering in place of the analog filters of the typical analog decoder. While providing satisfactory operation, this digital filtering technique consumes a great amount of digital signal processor (DSP) operating time.

Mitel, "An Introduction to Mitel DTMF Receivers," Application Note MSAN-106 (November 1981), pp. 3-3 to 3-9, describes another digital decoder. This system requires filtering to separate received signals into high and low bands and then uses a zero crossing count technique to detect tones in the two bands.

U.S. Pat. No. 4,354,248 to Conger et al, for "Programmable Multifrequency Tone Receiver," teaches the use of digital filtering to achieve multi-frequency decoding. A simplified filtering technique is implemented to reduce the number of required multiplications.

U.S. Pat. No. 4,379,347 to Girardi et al, for "Receiver for PCM-Encoded Multifrequency Dialing Signals," uses a decoding technique based upon a determination of the time duration between successive zero crossings of the received information signal.

U.S. Pat. No. 4,223,185 to Picou, for "Multifrequency Digital Signal Receiver," teaches a digital decoding technique using digital filters implemented with the fast Fourier transform (FFT).

U.S. Pat. No. 4,328,398 to Kawaguchi et al, for "Digital Multi-Frequency Receiver," discloses a digital MF detector using a digital filter coupled to filter each of the possible frequencies of interest. A large number of multiplications are required for the filtering process. Consequently, the arrangement is unsuitable for many low cost applications where the cost of the extensive data processing capability is not appropriate.

SUMMARY OF THE INVENTION

An all digital feature based pattern recognition tone detection system and method in accordance with the invention detects one or more tones from a received signal. Tone signals are distinguished from other signals such as speech or background noise. The inexpensive hardware implementation using a programmed digital speech processor coupled with an efficient detection technique using Linear Prediction Coding (LPC) renders the system suitable for high volume, low cost applications.

In accordance with the invention, if the received signal is in analog form it is sampled to generate digital representations of a frame of sampled data points of the received signal. Once the received signal is in digital form the system proceeds by using a modified PARCOR signal analysis technique to calculate inverse filter coefficients defining in functional form a smoothed LPC spectrum from the digital representations. A Fourier transform is used to provide a high resolution evaluation of the LPC spectrum for the sample frame at selected frequencies in the vicinity of the 8 DTMF frequencies. A combination of time domain tests and frequency spectrum evaluation tests are used to determine whether or not a frame represents a DTMF signal.

Several techniques facilitate real time decoding by reducing the requirements for processing capacity. Processing is reduced by as much as 30:1 compared to DFT techniques. One such technique is the testing for the presence of tone signals at predetermined known frequencies without reconstructing the entire frequency spectrum of the received signal. Additional techniques include use of an improved matrix inversion algorithm and storage of tables of precomputed sine and cosine values.

The reduced processing requirements and high reliability including resistance to speech induced talk-off, to twist and to change in dynamic range make the system particularly suitable for use as a DTMF Touch-Tone signal decoder. The cost is sufficiently low to render practical the use of the system in telephone voice messaging systems.

The functional LPC representation form combined with programmable tests to recognize selected signal features enables performance to be optimized for specific applications. For example, testing thresholds might be adjusted to assure that all valid tones are recognized or alternatively to reduce false recognition. Optimized performance can thus be achieved for many different applications at reduced cost.

BRIEF DESCRIPTION OF THE DRAWINGS

A better understanding of the invention may be had for a consideration of the following detailed description taken in conjunction with the accompanying drawings, in which:

FIG. 3 is a flow chart illustrating in greater detail a time domain analysis step in the method shown in FIG. 2;

FIG. 4 is a schematic and block diagram illustrating the derivation of linear prediction coding;

DETAILED DESCRIPTION OF THE INVENTION

Figure 1:
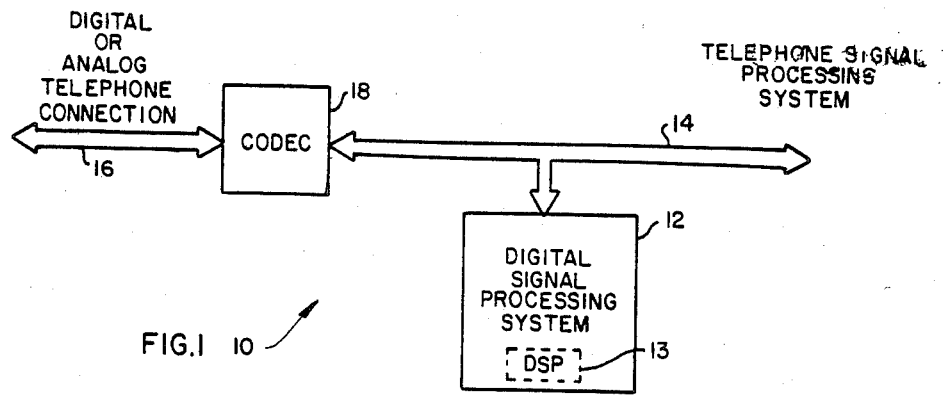
FIG. 1 is a block diagram representation of a tone decoder system in accordance with the invention.

Referring to FIG. 1, there is shown a digital tone decoder system 10 in accordance with the invention implemented as a digital signal processing system 12 coupled by a digital communication bus 14 to a codec 18 and a telephone signal processing system (not shown). The telephone signal processing system may in general be a voice messaging system, a switching system or any other system which requires the detection of tone signals.

An input digital or analog signal channel 16 carrying information to be decoded is coupled to the codec 18. In the present example it is assumed that the received signals are in digitized form. That is, data is received in frames or groups containing 180 samples taken at a frequency of 8 kHz over a frame period of 22.5 milliseconds. If in a μ-law, A-law or other coding format, codec 18 converts the audio signals to a linear pulse code modulation (PCM) format with 12 bits of resolution. Alternatively, the audio signals might be received over channel 16 in an analog form and converted by an analog-to-digital converter (not shown) to a 12 bit linear PCM format.

The digital signal processing system 12 is advantageously implemented to include a digital signal processor 13 such as the Texas Instruments Corporation TMS 32010 DSP. This is a 16 bit microprocessor that is adapted for efficient execution of signal processing related arithmetic instructions. The signal processing system 12 also includes conventional memory and interface circuits as required to provide an operable system.

The tone decoder system 10 shown in FIG. 1 and the corresponding method of the invention are particularly useful for discriminating between tones and speech while detecting one or more tones from a signal containing non-tone information such as speech or noise. It is thus highly suitable for use as a digital dual tone multifrequency (DTMF) detector for detecting dial or command tone signals in telephone systems. However, it can also be useful in other tone detection environments.

When employed as a DTMF telephone decoder, the system 10 must detect the condition when exactly one tone signal is present from each of two high and low band tone groups and otherwise reject the signal. Valid signals must be properly detected notwithstanding a wide range of signal variations which include center frequency offset, tone amplitude mismatch (twist), a wide signal dynamic range, low signal to noise ratio (SNR), high channel noise, and variable tone burst duration. At the same time, the system must avoid digit simulation or talk-off. That is, false validation of tone signals resulting from the occurrence of coincidental speech or other signals at the DTMF frequencies.

As one might expect, a relaxation of detection threshold requirements helps to assure that all actual tones are properly detected, but also increases the probability that a non-tone signal will be detected as a DTMF signal. The system 10 affords a selectability of detection parameters and thresholds which helps optimize the system 10 for a specific application. For a system having a given data processing capability, an optimum combination of true tone validation and false tone rejection can be achieved. In the present instance, not more than 15% of the digital signal processing system 12 instruction cycles are used for tone detection. The remaining capability is thus available for other system functions. For example, tones can be detected in multiple channels on a time multiplex basis.

The following are typical worst case standards for DTMF signal specifications:

A. Impact dynamic range: 31 26 dBm to +6 dBm
B. Twist (High/Low): −8 dBm to +4 dB
C. Minimum tone burst: 40 msec ON, 40 msec OFF
D. Repetition rate: 12 pulses per second
E. Valid tone accept: within 1.5% cf
F. Invalid tone reject: beyond 3.5% of
G. Signal-to-noise ratio: 16 dB The digital tone decoder 10 employs feature-based pattern recognition algorithms which extract the received signal parameters and compare them to the minimum signal specifications. Three generalized criteria are then applied to the validation of a received data sample as a DTMF TONE. They are:

1. Accept only signals with exactly two of the expected 8 frequencies, one in each group. Both tone signals must be nearly the same in amplitude and within the range of the expected signal strength.
2. Reject signals which are accompanied by significant energy at frequencies other than the predetermined DTMF frequencies.
3. Accept only signals that satisfy the specification minimum timing requirements such as minimum tone duration and minimum interdigit pauses.

The first two criteria require frequency domain analysis while the third requires time domain analysis. Frequency domain spectral analysis conventionally uses computationally expensive techniques such as the Discrete Fourier Transform (DFT) or digital filtering. However, the digital tone decoder 10 substantially reduces the processing power required for frequency domain analysis by using Linear Prediction Coding (LPC) analysis.

The LPC technique is implemented by computing a set of linear prediction filter coefficients to obtain an inverse filter function A(z) where z is the Z-transform operator. A relatively few, for example 6 to 8, filter coefficients have been found to be adequate for DTMF tone detection. A Fourier transform is then used to evaluate the inverse filter transfer function at a relatively few (49) frequencies that are of specific interest to DTMF tone detection.

Because of the relatively small processing capacity demands of the LPC analysis and the relatively small number of frequencies at which Fourier analysis is made, computation can be reduced by as much as 10:1 compared to conventional techniques. In addition, it is often possible to use the results of the LPC analysis for other purposes such as speech compression, pause detection and, in some circumstances, automatic gain control.

Some aspects of the time domain analysis are inherently executed by the selection of the frame period. The frame period must be chosen to be long enough for good spectral resolution but not long enough to miss significant temporal changes. A frame period between 10 and 25 msec is usually acceptable for LPC signal analysis. The frame period of 22.5 msec has been selected in the present instance.

Reliable detection of a tone within a frame using LPC signal analysis requires a tone duty cycle extending over at least 80% of a frame (18 msec). Hence, a tone will not be properly recognized if it does not extend for at least 18 msec. For tone recognition, the worst case condition occurs when a tone extends across two frames. If the tone is at least 36 msec in duration, then it must meet the 80% duty cycle requirement for at least one of the two frames. Since the minimum pulse duration specification is 40 msec, the system will detect a valid pulse.

Figure 2:
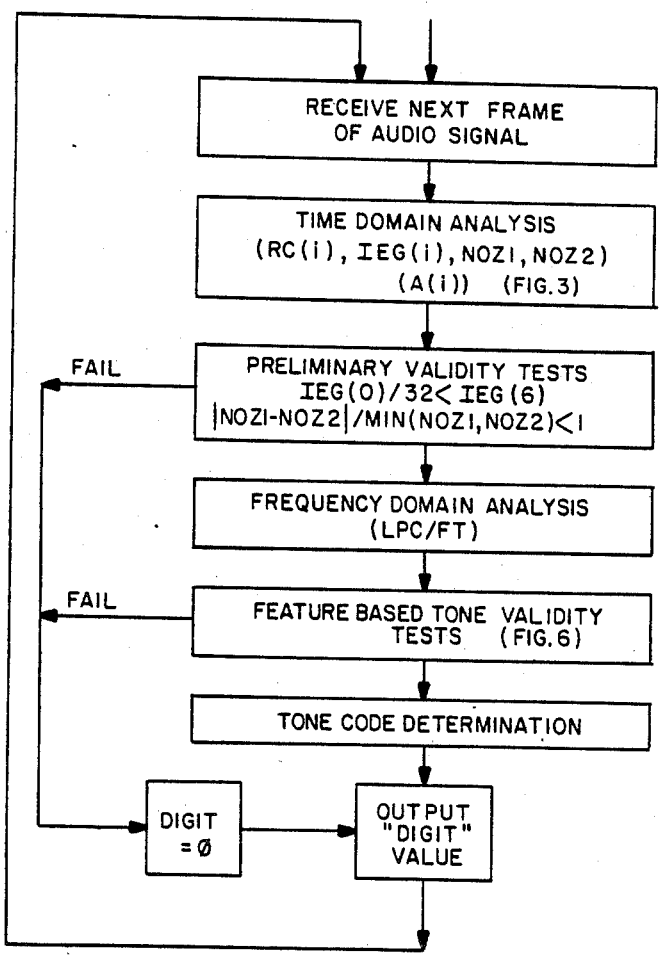
FIG. 2 is a flow chart illustrating a preferred method of using linear prediction coding to analyze a frame of data and determine if it represents a valid DTMF tone signal.

A summary flow chart of the decoding method of the invention is illustrated in FIG. 2. Upon receipt of a next frame of an audio signal, time domain analysis is performed. In general, this time domain analysis includes generation of signal zero crossing counts, NOZ1, NOZ2; reflection coefficients array, RC(i); a normalized residual energy array IEG(i); and the inverse filter coefficients array, IA(i).

Certain preliminary tone validity tests are then performed upon the time domain analysis data. If a frame fails the preliminary tone tests, processing capacity for the given frame can be conserved by eliminating time consuming frequency domain analyses and testing. Experimental results suggest that up to 90% of the non-DTMF data frames can be rejected at this point while passing all valid frames.

If a frame passes the preliminary tone testing step, frequency domain analysis is performed to execute a linear prediction coding Fourier transform (LPC/FT). This frequency domain analysis produces arrays of frequency data describing the frame at 6 frequencies in the vicinity of each of the 8 known DTMF frequencies. An array of spectrum data is then tested in a series of tests and, if it passes, is used for tone determination, which can simply be a table look-up operation.

A variable called "DIGIT" is set during the tone code determination step to reflect the detected combination of tones and its value. The value of DIGIT is then output over bus 14 to the telephone signal processing system at a step designated Output Digit Value. Whenever a frame is rejected, DIGIT is set to zero at step DIGIT=0 and the value of zero is then output as an explicit indication that a frame has been analyzed and rejected.

After a code representing a decoded tone is communicated to the telephone signal processing system, the digital signal processing system 12 waits for receipt of a next frame of data. It can, of course, perform other system related functions while it is waiting.

The time domain analysis step is shown in greater detail in FIG. 3, to which reference is now made. Time domain analysis begins with a conversion of a received data frame to a linear PCM data format, if the data is not already in such a format. Typically, a data is received from the CODEC 18 in an A-law or $\mu$-law format and conversion is required.

Scaling and windowing are then simultaneously executed to adjust the data frame to a full 10 bit resolution using the equation, $$y(n) = [s(n) * ihw(n) * 2^{**}jcont]/2^{15} \qquad (1)$$

Where: ihw(n) is the Hamming window, $$ihw(n) = (0.54 - 0.46 * COS[(2*PI*n)/N=1])*32,767 \qquad (2)$$

(where * denotes multiplication) which is applied to the linear data. The window reduces any discontinuity between the first and last sample points in the frame to obtain a better spectral resolution. To reduce real time processing demands, the Hamming values ihw(n) are precomputed and stored for each data point. Because of symmetry, only 90 values need actually be stored.

The scaling factor jcont represents the number of left bit shifts required for the largest sample point in the frame, MAX{(s(n)}, to have a value greater than $2^{}10$. That is, to have a one in the eleventh bit position. The value of jcont is readily attained by counting the number of times MAX{s(n)} must be multiplied by two to attain a value greater than $2^{}10$.

The inverse filter coefficients are then developed using the autocorrelation method of linear prediction coding. Further, the partial correlation or PARCOR variation of the autocorrelation method is utilized to reduce processing demands while providing adequately accurate results in this fixed point implementation.

For completeness, a brief summary of linear prediction coding will be presented at this point. However, reference should be had to available publications such as *Linear Prediction of Speech*, Markel and Gray, Springer-Verlag (Berlin, Heidelberg, N.Y. 1976) and V. LeRoux and C. Gueguen, "A Fixed-point Computation of Partial Correlation Coefficients", *IEEE Trans.* ASSP-25, p 257 (1977) for a more thorough understanding of linear prediction coding (LPC) and the fixed point PARCOR algorithm.

The model for development of LPC is illustrated in FIG. 4 using Z-transform notation. A received signal S(z), such as a telephone speech signal, is presented to a subtractor 40 and also to a filter F(z) 42. Subtractor 40 subtracts the output of filter 42 from the original signal to produce an error signal E(z).

Error signal E(z) can thus be defined as $$E(z)=S(z)-S(z)F(z)=S(z)(1-F(z)) \quad (3)$$

Letting $$A(z)=1-F(z) \quad (4)$$

then $$E(z)=S(z)A(z) \quad (5)$$

A(z) is represented by a polynomial series, $$A(z)=1+SUM\{a_i z^{-i}\} \ (i=1, 2, P) \quad (6)$$

where P is the order of the inverse filter. For a converging series, $a_i$ becomes small as $a_i$ becomes large and reasonably accurate results can be achieved using a finite number for P. It has been experimentally determined that a value of P=6 is adequate for distinguishing precisely defined DTMF sinusoidal signals from speech patterns and noise. A larger number of terms increases the accuracy of the representation but also requires more processing time.

A number of techniques have been developed for determining the values of $a_i$. A technique called partial correlation, or PARCOR, is used in the digital signal processing system 12 because it provides reasonably accurate results using 16 bit fixed point arithmetic. Using the PARCOR method, the traditional autocorrelation coefficients are developed from the windowed and scaled data points, y(n). The autocorrelation coefficients are computed as, $$r(k)=SUM\{y(n)*y(n+k)\} \ (n=0,1,2,,N-1) \text{ for } (k=0,1,2,,P) \quad (7)$$

The traditional autocorrelation method would then create from the P correlation coefficients a P×P array of the form, $$SUM\{a_i r(|i-j|)\}=-r(j)\} \ (i=1,2,,P) \text{ for } (j=1,2,,P) \quad (8)$$

The resulting array represents P equations in P unknowns ($a_1$-$a_p$) and can be solved for the P inverse filter coefficients, $a_i$.

However, even for order P=6, solution of the equations on a real time continuing basis presents a substantial challenge for a 16 bit fixed point processor such as is used in digital signal processing system 12.

The PARCOR method avoids solving the correlation matrix by deriving a set of PARCOR coefficients (also referred to as reflection coefficients) from the autocorrelation coefficients and then deriving the $a_i$ inverse filter coefficients from the PARCOR coefficients.

One fixed point PARCOR algorithm, taught by LeRoux and Gueguen uses recursive computation to obtain a P term normalized residual energy array {IEG(i)} and a P term reflection coefficient array {RC(i)}. However, the recursion is modified in accordance with the present invention to avoid severe inaccuracies which can result from numerical round off to 16 units. Highly coherent signals, such as the nearly pure sinusoidal signals of DTMF tones, have been found to be particularly troublesome and can even lead to the calculation of negative residual energy.

The digital signal processing system 12 avoids these serious numerical errors by terminating the recursion when the calculated residual energy falls below a selected threshold. All remaining coefficients are then set to zero. Experimental results suggest that a threshold of approximately 32 represents a preferred trade off between premature termination of the recursion and calculation of inaccurate reflection coefficients. Satisfactory results can be obtained for a threshold in the range of 16 to 64.

Figure 5:
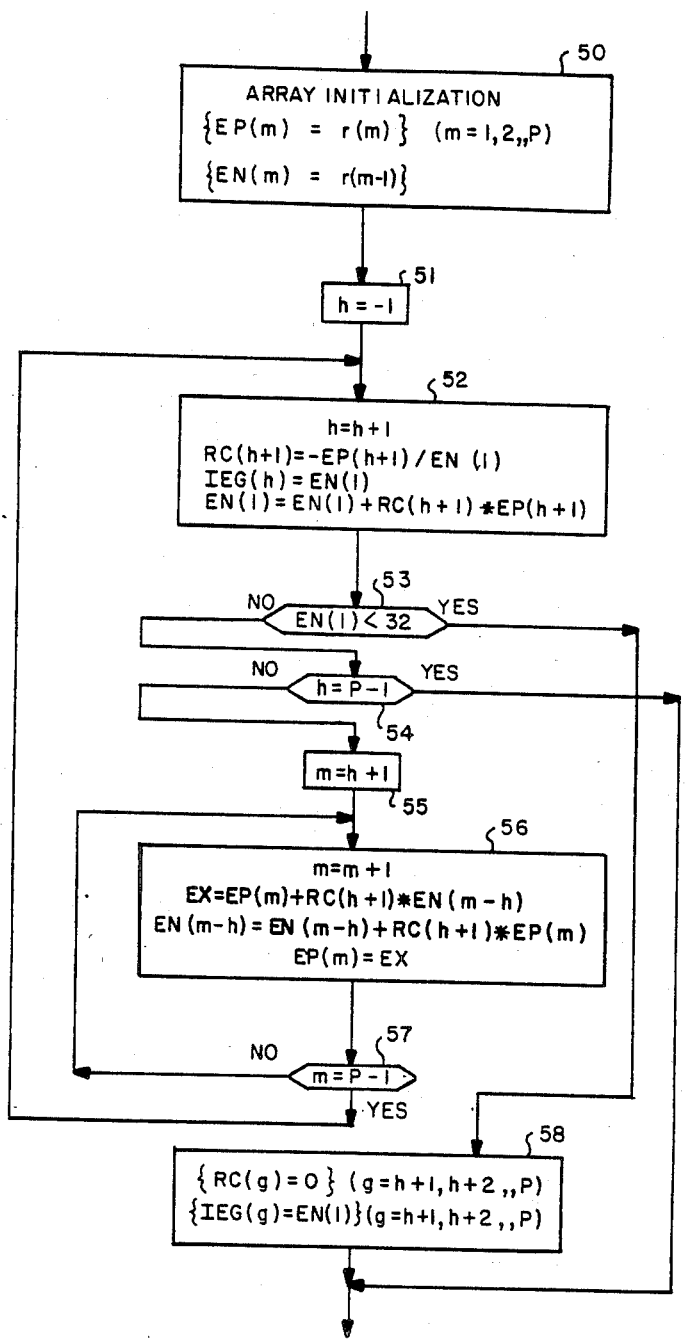
FIG. 5 is a flow chart illustrating a preferred recursion method of generating partial correlation coefficients and normalized energy values from correlation coefficients.

The modified PARCOR recursion is described with reference to FIG. 5. Before the PARCOR coefficients are calculated, the autocorrelation coefficients are scaled for optimum use of the 16 bit representation by dividing each of them by 2 (right shift) npow times until $r(0)<215$, where  denotes exponentiation.

The modified LeRoux and Gueguen algorithm begins by initializing the normalized residual energy array, $EN(m)=R(m-1)$ and an intermediate variable array $EP(m)=R(m)$ at initialization step 50. An outer loop counter variable, h, is then initialized at $-1$ in a step 51.

The recursion then begins at a step 52 with the counter h being incremented. The next PARCOR coefficient is calculated as $$RC(h+1)=-EP(h+1)/EN(1) \quad (9)$$

and the next energy array term is calculated as, $$IEG(h)=EN(1) \quad (10)$$

EN(1) is then modified for the next iteration as $$EN(1)=EN(1)+RC(h+1)*EP(h+1) \quad (11)$$

Next, at step 53, an exit test is made. If the current residual energy term, EN(1), is less than a predetermined threshold value such as 32 the end step 58 is executed to modify the PARCOR algorithm by truncating the iteration and setting all remaining RC's to zero and all of the remaining residual energy terms to the current residual energy term value. If the truncation test 53 fails, execution proceeds by checking whether $h=P-1$ in step 54. If yes, then the algorithm is exited.

If the exit test 54 fails, execution proceeds by setting a second, inner loop counter, m, to $m=h+1$ at a step 55. A calculation step 56 is then repeatedly executed until after m has been incremented to P−1. At step 56 m is incremented and an intermediate variable EX is calculated as, $$EX=EP(m)+RC(h+1)*EN(m=h) \quad (12)$$

Intermediate negatively indexed energy terms EN are then updated as, $$EN(m-h)=EN(m-h)+RC(h+1)*EP(m) \quad (13)$$

Finally the positively indexed energy term is updated as, $$EP(m)=EX \quad (14)$$

At step 57 the inner loop index m is compared to P−1. If they are equal the inner loop recursion is complete and the outer loop returns control to step 52. If m is less than P−1 the inner loop iteration continues at step 56.

The inverse LPC filter coefficients, $a_i$, can then be recursively computed from the reflection coefficients RC(i) using the following recursion for each k=1 to P:

$$a(k,i) = a(k-1, i) + RC(k)*a(k-1, k-i) \text{ for } i=1 \text{ to } k-1 \quad (15)$$

and $a(k,k) = RC(k)$.

Since $a(1,1)$ is defined to be $RC(1)$, the recursion begins by calculating $a(2,1)$; then $a(3,1)$, $a(3,2)$; then $a(4,1)$, $a(4,2)$, $a(4,3)$ and so forth. The final set of recursion calculations with $k=P$ produces the desired LPC filter coefficients, $$a_i = a(P,i), i=1,2, ,P \quad (16)$$

To optimize the accuracy of further calculations, the $a_i$ are scaled to place 11 bits to the right of the binary point in the 16 bit fixed point representation.

Letting $a_0=0$ represent the number 1 term in Equation 6, the finite impulse response filter $A(z)$ can be represented as, $$A(z) = SUM\{a(i)*z**(-i)\}, (i=0,1, ,P) \quad (17)$$

This is the inverse filter for the signal spectrum $S(e**jw)$ where w is the normalized frequency $$w = 2\pi f/f_{sf} \quad (18)$$

where f is frequency in Hertz and $f_{sf}$ is the sampling frequency in Hertz (8000). The inverse filter, $A(z)$ removes the spectral envelope structure of $S(e**jw)$ when the signal s(n) is passed therethrough to produce an output having a flat spectral response. $A(z)$ is an all zero filter.

Conversely, $1/A(z)$ is an all pole filter whose spectral frequency response, $1/A(ejw)$, which is also called the LPC spectrum, is an approximation of the spectral envelope of the signal spectrum $S(ejw)$. In the case of a DTMF signal, the spectral envelope is essentially the two tones of the DTMF signal.

DTMF detection can then be accomplished by evaluating the LPC spectrum in the region of DTMF frequencies, and locating the peaks of the LPC spectrum, one from the low frequency group and one from the high frequency group. The spectral computation is reduced compared with a Discrete Fourier Transform (DFT) of the received signal s(n) because only a few (6) LPC coefficients are used instead of the whole set of 180 original data points.

In order to eliminate division steps and thus reduce processing requirements, the inverse filter functon $A(z)$ is used for analysis and testing rather than the function $1/A(z)$. Strong DTMF signals thus produce valleys rather than peaks in the inverse filter spectrum $A(e**jw)$ at the DTMF signal frequencies. It should therefore be appreciated that evaluation of the spectral response and the inverse spectral response are direct reciprocal equivalents of one another with peaks or maxima corresponding to valleys or minima, with upper thresholds corresponding to lower thresholds and with lower thresholds corresponding to upper thresholds.

Two preliminary tone validity tests are actually performed in the present embodiment of the digital signal processing system 12. The first is a signal coherency check to determine whether the residual energy coefficients have the relationship IEG(0)/IEG(P) > 15 dB. If the PARCOR coefficient recursion is terminated before IEG(P) is calculated, then a value of 32 is used for IEG(P) in this test.

The residual energy array, [IEG(i), i=0,1, ,P] obtained during the time domain analysis has the property of occurring in descending order. That is IEG(k) ≦ IEG(j) if k > j. The rate of descent depends on the coherence of the signal and can thus be used as a pre-screening indicator. For signals with little or no coherence, such as silence, the rate of descent and hence the ratio IEG(0)/IEG(P=6) is small (< 10 dB).

Speech is somewhat more coherent and produces a larger ratio of about 10–15 dB. Pure tones produce a very high ratio ≧ 25 dB, even for a small order LPC filter of P=6. The ratio is reduced, however, if the tone is imbedded in speech or noise.

A threshold of 15 dB is chosen for the present embodiment. Thus, the frame is rejected if $$10 \log (IEG(0)/IEG(6)) < 15 \quad (19)$$

However, processing time is reduced by avoiding the log computation and using the equivalent test, $$IEG(0)/32 < IEG(6) \quad (20)$$

The division by 32 is accomplished with 5 bit shifts to the right, each effectively reducing the value of IEG(6) by 3 dB.

Referring again to FIG. 3, after the LPC filter coefficients are determined, time domain analysis and processing continues by counting the zero crossings of the scaled and windowed frame of input signal data s(n).

A zero-crossing (ZC) count indicates the number of times that the signal represented by a received data frame crosses the zero magnitude line or changes sign. The digital signal processing system 12 uses a slight modification of the conventional counting algorithm which facilitates distinguishing silence intervals from DTMF tones.

Silence intervals usually are characterized by low level white noise signals which produce large zero-crossing counts and have sufficiently high average frequencies to produce counts much higher than ordinary speech or DTMF signals. However, background noise or low frequency signals superimposed on DTMF or speech signals can increase the zero crossing counts of DTMF or speech signals to the same range as silence signal zero crossing counts.

To more reliably count the zero crossings in a frame the data samples are actually compared to a rectangular pulse threshold (RPT) signal having the form:

$$RPT(n) = 10*(-1)**(n+1) \quad (21)$$

Signal RPT thus has a magnitude of 10 and changes sign with each successive one of the 180 sample data points in a frame of received signal data.

The digital signal processing system 12 maintains separate ZC counts for each first and second half frame of 90 sample data points each. The first half frame ZC count is designated NOZ1 and the second half frame ZC count is designated NOZ2. NOZ1 and NOZ2 are checked to see if the zero crossing behavior of the two halves of a frame are similar.

As indicated in FIG. 2, the time domain analysis or processing is followed by preliminary validity testing. Preliminary testing consumes a relatively small amount of processor capacity. If a frame of data can be rejected in response to time domain testing, the more demanding requirements of Fourier transformation and frequency domain testing can be avoided. Experimental results suggest that up to 90% of the data frames can be eliminated through time domain testing.

The second preliminary tone test uses the zero count information, NOZ1, NOZ2. The frame is rejected unless $$|NOZ1-NOZ2|/MIN(NOZ1, NOZ2) < 1 \quad (22)$$

In other words, the frame is rejected if the two half frame counts differ by a ratio of more than two to one. The test is actually executed by the equivalent mechanism of comparing ½ the larger frame count to the smaller frame count.

LPC analysis results for partial frames with a signal present for only part of the frame are unreliable for DTMF detection. The half frame zero crossing counts are larger for noise or silence and small for speech or tones. Hence the compared ratio is expected to be quite small if a full frame contains a homogeneous signal pattern throughout. However, a frame containing noise or silence in a substantial portion thereof and speech or tones in the rest will produce a high ratio and be rejected. Note that a frame comprised of mostly noise or silence will have insufficient coherence to pass the first, signal coherency test. A zero count ratio greater than 1 indicates that the two halves of the frame contain grossly different signals and results in rejection of the frame.

As indicated in FIG. 2, if a frame of received data passes the preliminary validity tests, frequency domain analysis is performed upon the inverse filter function A(z) to obtain the Fourier transform at predetermined frequencies of interest.

It is known that the DTMF signals comprise four low band signals at 697, 770, 852 and 941 Hertz and four high band signals at 1209, 1336, 1477 and 1633 Hz. The present invention advantageously uses this information to evaluate the frequency response to the inverse filter function only in the vicinity of the frequencies of interest.

The LPC/FT Fourier transform is accomplished by making the substitution $$z = e^{o*jw} \quad (23)$$

into A(z). The resulting inverse filter spectrum when evaluated at a specific frequency is a complex number having real and imaginary parts defined as, $$REAL = SUM\{a(i)* \cos(iw)\} \ (i=0,1,,P) \quad (24)$$

$$IMAG = SUM\{a(i)* \sin(iw)\} \ (i=0,1,,P). \quad (25)$$

The inverse filter magnitude square at any given frequency, w, then becomes $$|A(e^{jw})|^{}2 = Real^{}2 + Imag^{}2 \quad (26)$$

where w is as defined by Equation (17). To conserve processing time, the filter magnitude square is used in the feature based frequency domain validation tests to avoid taking the square root.

The inverse filter spectrum is evaluated at at least three and preferably at six adjacent frequencies in the neighborhood of each DTMF frequency. The six frequencies are selected as two below the nominal center, one at the nominal center, two above the nominal center, and one half way between the nominal center and the nominal center of the next higher frequency. Evaluations thus occur at 6*8=48 frequencies. Later an evaluation is made at a 49th midband frequency of 1072 Hz half way between the high and low bands. In the low band the evaluation frequencies are spaced by 15 Hz and in the high band they are spaced by 25 Hz. The selected frequencies are presented in Table 1.

TABLE 1

| Evaluation Frequencies | | | | | | |
|---|---|---|---|---|---|---|
| (L1) | 667, | 682, | 697, | 712, | 727, | 734 |
| (L2) | 741, | 756, | 771, | 786, | 801, | 812 |
| (L3) | 823, | 838, | 853, | 868, | 883, | 897 |
| (L4) | 911, | 926, | 941, | 956, | 971, | 986 |
| (H1) | 1159, | 1184, | 1209, | 1234, | 1259, | 1273 |
| (H2) | 1287, | 1312, | 1337, | 1362, | 1387, | 1408 |
| (H3) | 1429, | 1454, | 1479, | 1504, | 1529, | 1557 |
| (H4) | 1585, | 1610, | 1635, | 1660, | 1685, | 1710 |

To conserve processing time, the sine and cosine values at the evaluation frequencies are precomputed and stored in a table. They are ordered as 6 cos (iw) values for 667 Hz, 6 sin (iw) values for 667 Hz, 6 cos (iw) values for 682 Hz, . . . , 6 sin (iw) values for 1710 Hz. In Equation (24) P+1 products of an 11 bit fractional filter coefficient and a 15 bit fractional cos term are summed to produce the value REAL. The value REAL is then shifted right 13 bit positions. Similarly in Equation (25) P+1 products of an 11 bit fractional filter coefficient and a 15 bit fractional sin term are summed to produce the value IMAG. The value IMAG is then shifted right 13 bit positions. The shifted REAL and IMAG terms are then squared and summed. Finally the inverse spectrum is produced by shifting the squared sum right by 13 bit positions.

The frequency domain analysis proceeds by storing the 48 spectral frequency values in a table and determining some indices which indicate the character of the data. The low group and high group are treated as two separate arrays substantially as shown in Table 1.

The minimum low group inverse spectral value is determined and identified by a row or low subgroup number, LOSUBN (0-3), and a column or low group index number, LOINDX (0-5). The minimum value is an indication of the tone strength and is stored in the variable LOMIN.

Similarly, the high group is evaluated to find the minimum value, HIMIN, at row HISUBN and column HIINDX.

Figure 6:
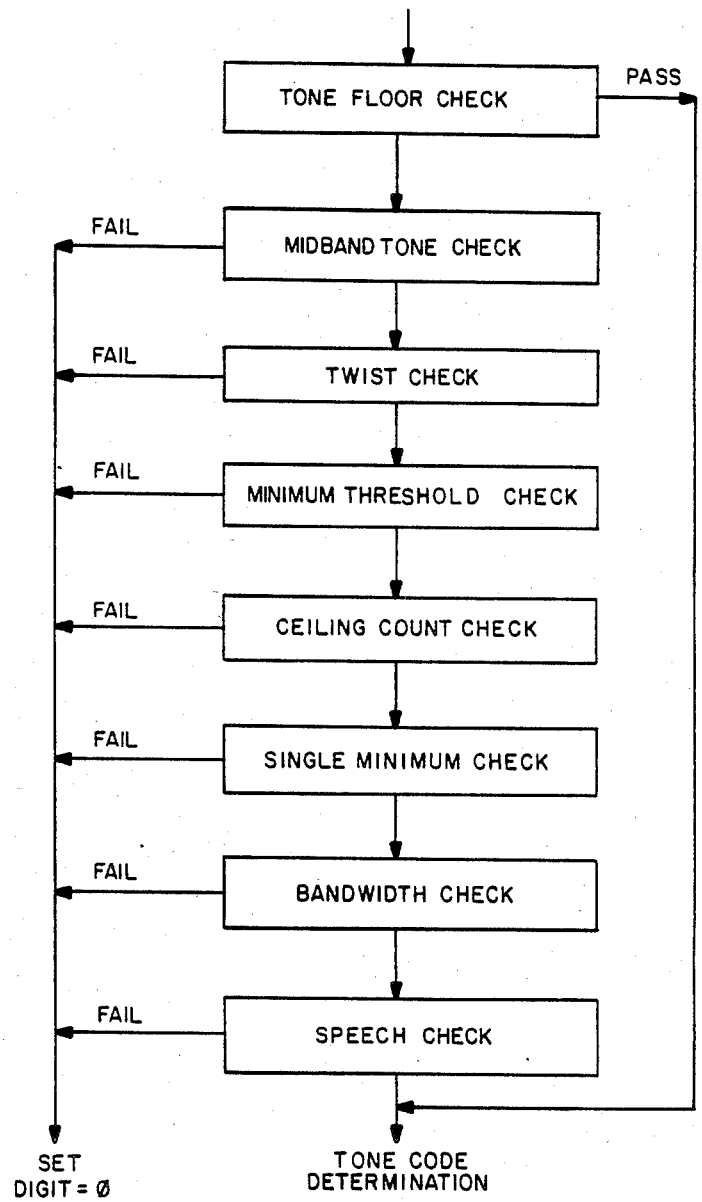
FIG. 6 is a flow chart illustrating in greater detail a frequency domain validity test step in the method shown in FIG. 2.

The frequency domain feature based validity tests then begin as shown in flow chart form in FIG. 6. The first, tone floor check, test is sufficient to validate the frame. If the frame passes this test, the tone code is determined and output to the associated telephone signal processing system. Otherwise, the remaining frequency domain tests are executed in succession. If any of these test fails, variable DIGIT is set to zero and its value output to the telephone signal processing system to indicate that the current frame does not represent a DTMF tone signal.

The tone floor check tests whether the minimum in each tone band is less than −42 dB. The equivalent test for saving computer time is whether the squared spectral magnitude stored in the spectral arrays is zero (the binary point is just to the left of bit 13 counting 15 to 0). Only very strong, pure tones can result in such a small inverse spectral value. Therefore, if two tones are below the spectral floor, then a valid DTMF frame is virtually certain and no further testing is performed. Execution branches to the determination and outputting of the corresponding tone code. Testing whether the inverse spectral value is less than a predetermined threshold is equivalent to testing whether the spectral value is greater than a predetermined threshold.

If the tone floor test fails, a midband tone check is made. This check computes the inverse spectral value at 1072 Hz, midway between L4=941 Hz and H1=1209 Hz. If the resulting midband value indication, MIDIF, is less than either of the minima in the high and low bands, the frame is rejected. This test is used because a strong midband signal may have sufficient bandwidth to produce spectral minima in the vicinity of L4 and H1, immediately below and above it. Without this test, DTMF tones L4 and H1 might be validated when in fact the frame represents a single midband tone rather than two DTMF tones. If actual spectral values were used, this test would be executed by determining whether the midband spectral value exceeds the largest spectral value in either the low group or the high group.

If a frame passes the midband check, a twist check is made. Twist is a variation in the magnitude of two DTMF tones, which are required by the specification to be substantially the same. The tone magnitude is, of course, manifested inversely by the generate spectral values.

The worst case specification for twist is −6 dBm to +4 dBm. Because of numerical errors which accumulate in the fixed point calculations and the finite order of the inverse filter function, a more relaxed test is made. The two minima are actually tested for a difference of 12 dB. The equivalent numerical test that is used to avoid logarithmic calculations is whether one fourth of the larger value is greater than the smaller value. Division by four is, of course, accomplished by shifting the larger value to the right 2 bit positions. If the twist is greater than the threshold value of 12 dB, the frame is rejected.

If a frame passes the twist test, a minimum threshold test is performed. This test is similar to the floor test except that it is less stringent. This test determines whether both minima fall below −27 dB. It is executed by shifting the (inverse filter) squared spectral values of the minima to the right 14−9=5 bit positions and then comprising the shifted values to zero. Unless both minima are less that the threshold value, the frame is rejected. The equivalent test using spectral values instead of inverse spectral values would require the spectral value to exceed a predetermined threshold.

A frame passing the minimum threshold test is next subjected to a ceiling count check. If the number of inverse filter squared spectral values among the 24 values in each band exceeding a selected threshold is large, then the frame is less likely to be a tone frame. This is due to the fact that the sum (integral) of the LOG of the inverse filter frequency spectrum over the frequency domain is zero. If half of the 24 spectral values in each group exceed 1.76 dB, then the frame does not contain a DTMF tone. A squared spectral value is counted if its actual magnitude exceeds 1.5. Using actual spectral values, a frame would be rejected if more than half the values in the high or low group had a value less than a predetermined threshold value.

A group cross check constraint is also imposed during execution of the ceiling count check. If the lowest tone frequency produces the inverse spectral minima in the low group, then no more that 6 of the 24 evaluation values in the high group can exceed 1.5 or the frame is rejected. Similarly, if the minimum occurs at the highest tone frequency in the high group, then no more than 6 of the 24 evaluation frequency values in the low group can exceed 1.5 or the frame is rejected. It will be recalled that the binary point is deemed to be between bits 13 and 14 in the fixed point representation so that $2^{}14=1.0$ and $2^{}13=0.5$.

If a frame passes the ceiling count test, an inverse spectral single minimum check is performed to make sure that a single minimum has occurred in each of the high and low frequency bands. A frame fails this test if there is a second minimum within 12 dB of the deepest minimum in the same tone band. Using spectral values, a test would be made for a second maximum within a predetermined ratio of the greatest maximum.

The test is numerically executed by shifting the low band minimum, LOMIN, to the left 4 bit positions, thereby increasing it by 12 dB. The increased value is then compared to the other 23 squared spectrum values in the low band. Any of the compared values that is smaller than the minimum plus 12 dB is checked to see if the compared value is a minimum. If the compared value does not have a smaller value on one side or the other, it is deemed a minimum and the frame is rejected. If a frame passes the low band portion of the test, the test is repeated for the high band.

After the single minimum check is completed, a bandwidth check is made to see if certain bandwidth requirements are satisfied. The bandwidth is computed by locating the 3 dB points on both sides of the spectral valley in the low group.

The bandwidth is determined by shifting the minimum value, LOMIN, one bit position to the left to increase it by 3 dB. The shifted value is then compared to the other values on both sides of the minimum. The closest points which exceed the shifted min value on each side are used to define the band edges. The bandwidth is the difference between the frequencies represented by the band edges.

Since the DTMF tones are pure sinusoidal tones and a windowed frame of 180 provides accurate spectral resolution, the bandwidth is expected to be quite small. However, the determined bandwidth is increased by noise in the communication channel and numerical errors resulting from the fixed point implementation and finite sampling.

A total bandwidth is therefore allowed to be 71 Hz for the low band where data points are separated by about 15 Hz, and 111 Hz for the high band where data points are separated by about 25 Hz.

The test is actually implemented by storing the frequency associated with each of the 24 data points in a table and using the table to obtain the frequencies associated with the band edges (the first data points above the 3 dB values). The frequency of the low band edge is subtracted from the frequency for the high band edge and, if the difference is greater than 71 in the low group, the frame is rejected.

The bandwidth test is then repeated for the high band frequencies.

If a data frame passes the bandwidth test, a final, speech-check, tests is performed. It has been experimentally observed that speech tends to create talk-off or false DTMF tone validations at the lowest of the 4 tone frequencies in each group. If the minima occur at these tone frequencies (697 Hz and 1209 Hz), the frame is required to pass a more stringent floor test and have values below −33 dB instead of the normal floor of −27 dB. The test is executed by requiring that the minima have values of zero after being shifted to the right 14−11=3 bit positions. If one of the shifted values is greater than zero, the frame is rejected.

While there has been shown and described above a particular arrangement of a tone decoding system for the purpose of enabling a person of ordinary skill in the art to make and use the invention, it will be appreciated that the invention is not limited to the particular arrangement that has been disclosed. Accordingly, any modifications, variations or equivalent arrangements within the scope of the attached claims should be considered to be within the scope of the invention.

What is claimed is:

1. The method of digitally detecting a tone at at least one predetermined tone frequency in a received signal represented by a frame of sequential digital data samples, the method comprising the steps of:
    calculating an array of Z transform domain coefficients from the digial data samples approximately representing the frame of sequential digital data samples;
    evaluating a frequency spectrum represented by the array of Z transform domain coefficients at at least one evaluation frequency in a vicinity of each at least one predetermined tone frequency to obtain a spectral value indication at each evaluation frequency;
    testing each said spectral value indication for a presence or absence of a tone in the vicinity of each of the at least one predetermined tone frequency to determine for each predetermined tone frequency whether or not the received signal contains a tone at the predetermined tone frequency; and
    providing an indication of whether any of the tones at at least one predetermined tone frequency is in the received signal represented by the frame, and if any of the tones are in the signal, the predetermined frequencies of the tones that are present in the received signal.

2. The method of detecting according to claim 1 above, wherein the at least one predetermined frequency includes at least 8 DTMF frequencies and the evaluating step includes evaluating the frequency spectrum of the frame at at least 6 evaluation frequencies in the vicinity of each DTMF frequency.

3. The method of detecting according to claim 2 above, wherein the frame represents a 22.5 millisecond time interval of the received signal and contains 180 digital data values.

4. The method of detecting according to claim 2 above, wherein the evaluating step includes calculating an array of autocorrelation coefficients, calculating an array of partial autocorrelation coefficients from the correlation coefficients using a recursive calculation technique and calculating the array of Z transform domain coefficient from the partial correlation coefficients using a recursive calculation technique.

5. The method of detecting according to claim 1 above, wherein the at least one predetermined frequency consists of a combination of exactly one frequency from a low group of frequencies and exactly one frequency from a high group of frequencies and wherein the providing step includes the step of providing an indication of whether a combination of exactly one tone at a low group frequency and exactly one tone at a high group frequency is present in the received signal.

6. The method of detecting according to claim 5 above, wherein the testing step includes the step of determining which spectral value indication at an evaluation frequency in the vicinity of the low group tone frequencies indicates a greatest low group spectral value, determining which spectral value indication at an evaluation frequency in the vicinity of the high group tone frequencies indicates a greatest high group spectral value, and determining that the received signal does not contain a valid combination of tones if the ratio of the indicated greatest low group spectral value and indicated greatest high group spectral value are not within a predetermined range.

7. The method of detecting according to claim 1 above, wherein the testing step includes the step of determining that the ratio is not within the predetermined range if the larger of the two indicated low group and high group spectral values divided by four is greater than the smaller.

8. The method of detecting according to claim 5 above, wherein the testing step includes the step of determining that the received signal does not contain a valid tone combination if either the spectral value indication indicating a greatest spectral value at an evaluation frequency in the vicinity of the low group of tone frequencies indicates a spectral value less than a predetermined minimum threshold value or the spectral vaue indication indicating a greatest spectral value at an evaluation frequency in the vicinity of the high group of tone frequencies indicates a spectral value less than the predetermined threshold value.

9. The method of detecting according to claim 8 above, wherein the evaluating step includes evaluating the frequency spectrum at at least six frequencies in the vicinity of each predetermined tone frequency and wherein the testing step includes the step of increasing the threshold value to a second threshold value if the indicated strongest frequency in both the low group and high group of tone frequencies occurs at an evaluation frequency which is a lowest evaluation frequency in the vicinity of a predetermined tone frequency.

10. The method of detecting according to claim 5 above, wherein the testing step includes the steps of determining which spectral value indication at a frequency in the vicinity of a low group tone frequency indicates a highest spectral value, determining which spectral value indication at a frequency in the vicinity of a high group tone frequency indicates a highest spectral value, and determining that exactly one tone is present at a low group frequency and exactly one tone is present at a high group frequency when the determined low group highest spectral value indication and the determined high group highest spectral value indication both indicate a spectral value in excess of a selected threshold.

11. The method of detecting according to claim 5 above, wherein the evaluating step includes evaluating a frequency spectrum represented by the array of Z transform domain coefficients to obtain a spectral value indication at a frequency midway between the low group and high group tone frequencies and wherein the testing step includes determining that the received signal does not contain a valid tone combination if the midway frequency spectral value indication indicates a spectral value greater than either a greatest spectral value indicated by a spectral value indication at an evaluation frequency in the vicinity of a low group tone frequency or a greatest spectral value indicated by a spectral value indication at an evaluation frequency in the vicinity of a high group tone frequency.

12. The method of detecting according to claim 5 above, wherein the testing step includes the step of determining that the frame does not represent a valid tone combination if the spectral value indication for more than half of the evaluation frequencies in the vicinity of the low group tone frequencies indicate a spectral value less than a selected low group threshold value or if the spectral value indication for more than half of the evaluation frequencies in the vicinity of the high group tone frequencies indicate a spectral value less than a selected high group threshold value.

13. The method of detecting according to claim 5 above, wherein the testing step includes the step of determining separately for both the high group of tone frequencies and the low group of tone frequencies the spectral value indication which indicates the largest spectral value and determining that the received signal does not represent a valid tone combination if a spectral value indication for a second evaluation frequency in the vicinity of a tone frequency in the group indicates a spectral value that is a maximum and has an indicated spectral value within a threshold ratio of the indicated largest spectral value.

14. The method of detecting according to claim 5 above, wherein the evaluating step includes evaluating the frequency spectrum at at least six frequencies in the vicinity of each predetermined tone frequency and wherein the testing step includes the step of determinimg that the received signal does not represent a valid tone combination if the bandwidth of the indicated strongest tone frequency in either the low group or the high group has a bandwidth indicated by the spectral value indications greater than a predetermined maximum bandwidth.

15. The method of detecting according to claim 1 above, wherein the calculating step calculates inverse filter coefficients using a linear prediction coding technique.

16. The method of detecting according to claim 1 above, wherein the digital data samples are encoded with linear pulse code modulation (PCM) coding.

17. The method of detecting according to claim 1 above, wherein the array of Z transform domain coefficients is of order 6.

18. The method of detecting according to claim 1 above, wherein the evaluating step evaluates the frequency spectrum of the frame at at least three different evaluation frequencies in the vicinity of each predetermined frequency.

19. The method of detecting according to claim 1 above, wherein the at least one predetermined frequency includes a plurality of frequencies in each of a low frequency group and a high frequency group and the evaluating step includes evaluating the frequency spectrum of the frame at a frequency midway between the low and high frequency groups.

20. The method of detecting according to claim 1 above, wherein the step of calculating an array of partial correlation coefficients uses the LeRoux and Gueguen recursion algorithm modified by terminating the recursion and setting all remaining partial correlation coefficients to zero when the value of the first term of the normalized residual energy array falls below a predetermined threshold.

21. The method of detecting according to claim 1 above, further comprising the step of checking for a full frame of similar information by counting the zero crossings in a first half frame and in a last half frame and eliminating the frame if the two counts differ by more than a threshold amount.

22. The method of detecting according to claim 1 above, wherein the testing step includes determining for each predetermined frequency whether the spectral value of each evaluation frequency proximate thereto satisfies selected criteria and determining that the received signal does not have a tone at the predetermined frequency if the criteria is not met, the criteria including the occurrence of a single maximum spectral value greater than a predetermined threshold value in the vicinity of each predetermined frequency.

23. The method of detecting according to claim 1 above wherein the testing step includes the step of determining that a tone is present at a predetermined tone frequency when a spectral value indication at an evaluation frequency in the vicinity of the predetermined tone frequency indicates a spectral value in excess of a selected threshold value.

24. The method of detecting according to claim 1 above, wherein the testing step includes the step of determining for each tone frequency that a tone is not present at the frequency if no spectral value indication for a frequency in the vicinity of the tone frequency indicates a spectral value in excess of a predetermined threshold value.

25. The method of detecting according to claim 1, above wherein the testing step includes the step of determining which evaluation frequency has a spectral value indication indicating the largest spectral value and determining that the received signal is not a tone signal if a spectral value indication at a second evaluation frequency indicates a spectral value that is a maximum and has a spectral value within a predetermined threshold range of the spectral value indicated by the largest spectral value indication.

26. The method of detecting according to claim 1 above, wherein the evaluating step includes evaluating the frequency spectrum at at least six evaluation frequencies in the vicinity of each predetermined tone frequency and wherein the testing step includes determining that the received signal does not represent a tone if the bandwidth of the spectral values indicated by the spectral value indications for evaluation frequencies surrounding an evaluation frequency having a spectral value indication indicating a largest spectral value is greater that a selected threshold.

27. The method of detecting according to claim 1 above, wherein the array of Z transform domain coefficients is an array of inverse filter coefficients and wherein the evaluating step includes the step of evaluating a frequency spectrum represented by the array of inverse filter coefficients at at least one evaluation frequency in a vicinity of each at least one predetermined tone frequency to obtain an inverse spectral value at each evaluation frequency.

28. The method of detecting a tone at each of a plurality of predetermined low group and high group frequencies in a received signal represented by a frame of sequential data samples, the method comprising the steps of:

calculating from the digital data samples an array of Z transform domain coefficients approximately representing the frame of sequential digital data samples;

evaluating a frequency spectrum represented by the array of Z transform domain coefficients at at least one evaluation frequency in a vicinity of each predetermined frequency to obtain a spectral value indication at each evaluation frequency;

testing each said spectral value indication in the vicinity of each predetermined frequency to determine whether or not the received signal contains exactly one tone at a predetermined low group frequency and exactly one tone at a predetermined high group frequency and providing an indication of whether the received signal contains a combination of one tone at a low group frequency and one tone at a high group frequency and, if it does, which combination.

29. The method of detecting telephone dialing tones at predetermined DTMF frequencies in a received signal comprising the steps of:

reresenting a frame of the received signal with sampled digital data values;

calculating linear prediction coding coefficients defining an inverse filter from the digital data values;

evaluating the Fourier transform of the inverse filter to obtain spectral values at selected frequencies including at at least one frequency proximate each predetermined DTMF frequency;

processing the spectral values at the at least one frequency proximate each predetermined DTMF frequency to determine for each predetermined DTMF frequency whether or not a dialing tone exists; and determining whether exactly one tone has been detected in each of two different frequency ranges and, if so, indicating a character corresponding to the detected tones.

30. The method of detecting a sinusoidal tone signal of a given tone frequency in a received data signal comprising the steps of:

digitally sampling the data signal at a predetermined sample rate to produce a sequence of sampled data points;

grouping the sequence of sampled data points into a sequence of data frames, each representing a predetermined number of sampled data points; and for each frame in succession evaluating the frame to determine whether or not the sinusoidal tone is present, said evaluating including the steps of:

performing time domain analysis of the data frame including the generation of an inverse filter transfer function of the form $$A(z)=1+SUM\ \{a_i z^{-i}\};\ (i=1,2,,P)$$

where z is the Z transform operator;

performing frequency domain analysis including a Fourier transform of the inverse filter transfer function to obtain spectral data at at least one frequency in the vicinity of the tone frequency; and evaluating the spectral data to determine the presence or absence of the sinusoidal tone.

31. The method of detecting a sinusoidal tone signal according to claim 30 above, wherein the inverse filter transfer function is generated using linear prediction coding.

32. The method of detecting a sinusoidal tone signal according to claim 30 above, wherein the inverse filter transfer function is generated using a linear prediction coding autocorrelation technique.

33. The method of detecting a sinusoidal tone signal according to claim 30 above, wherein the inverse filter transfer function is generated using a linear prediction coding partial correlation technique.

34. The method of detecting a sinusoidal tone signal according to claim 30 above, wherein the inverse filter transfer function is generated using a linear prediction coding partial correlation technique in which reflection coefficients and normalized residual energy terms are generated recursively, the recursion being terminated when the value of a generated residual energy term falls below a selected threshold which is greater than zero.

35. The method of detecting at least one sinusoidal tone signal, each of a given frequency, in a frame or sampled data representing a data signal comprising the steps of:

generating in response to the frame of sampled data a time domain finite polynomial sequence containing information that is indicative of a frequency spectrum of the frame of sampled date;

performing a Fourier transform of the finite polynomial sequence to obtain spectral frequency data at at least one frequency in the vicinity of the given frequency of each sinusoidal tone signal;

evaluating the spectral frequency data to determine the presence or absence of each of the sinusoidal tone signals.

36. A digital computer program for evaluating a frame of sampled data representing a received signal to determine the presence or absence of a tone signal in the received signal occurring at a frequency which is one of at least one predetermined tone frequency, the program comprising the steps of:

calculating from the sampled data an array of Z transform domain coefficients approximately representing the frame of sampled data;

evaluating a frequency spectrum represented by the array of Z transform domain coefficients at at least one evaluation frequency in a vicinity of each at least one predetermined tone frequency to obtain a spectral value indication at each evaluation frequency;

testing each said spectral value indication in the vicinity of each said at least one predetermined tone frequency to determine for each predetermined tone frequency whether or not the received signal contains a tone at the predetermined tone frequency; and providing an indication of whether the received signal carries a tone at one of the at least one predetermined frequency, and if the received signal does carry at least one tone, the predetermined frequency associated with each tone.

37. A decoder system comprising:

a data bus coupled to communicate digital data including sampled data representing a frame of a received signal; and a digital signal processing system including a digital data processor, the digital signal processing system including means for calculating from the sampled data an array of Z transform domain coefficients approximately representing the frame of sampled data;

means for evaluating a frequency spectrum represented by the array of Z transform domain coefficients at at least one evaluation frequency in a vicinity of each of at least one predetermined tone frequency to obtain a spectral value indication at each evaluation frequency;

means for testing each said spectral value indication in the vicinity of each predetermined tone frequency to determine whether or not the received signal carries a tone at the predetermined tone frequency; and means for communicating over the data bus an indication of whether or not the received signal has a tone at a predetermined tone frequency and if the received signal has a tone at a predetermined frequency, the frequency of each tone.

38. The decoder system according to claim 37 above, wherein the means for calculating includes means for using linear prediction coding to calculate the Z transform domain coefficients.

39. The decoder system according to claim 38 above, wherein the means for using includes means using partial correlation to recursively calculate the Z transform domain coefficients.

40. The decoder system according to claim 37 above, wherein the means for calculating is a 16 bit fixed point digital data processor.

* * * * *

UNITED STATES PATENT AND TRADEMARK OFFICE
CERTIFICATE OF CORRECTION

PATENT NO. : 4,689,760

DATED : August 25, 1987

INVENTOR(S) : Chin-hui Lee and David Y. Wong

It is certified that error appears in the above-identified patent and that said Letters Patent are hereby corrected as shown below:

Column 1, lines 49 and 50, "relative" should read --relatively--; line 60, "sample" should read --sampled--. Column 3, line 19, "for" should read --from--. Column 4, line 44, strike "31" and "26 dBm" should read -- -26 dBm --. Column 6, line 19, after "Typically,", strike "a"; line 30, "N=1" should read --N-1--; line 65, "subtractor" (first occurrence) should read --subtracter--; line 65, "Subtractor" (second occurrence) should read --Subtracter--. Column 7, line 16, after "as", "a." should read --$a_i$--. Column 11, line 38, after "response", "to" should read --$o̊f$--. Column 13, line 44, "comprising" should read --comparing--. Column 14, line 40, after "180", insert --samples--; line 61, "tests" should read --test--. Column 15, line 19, "digial" should read --digital--; line 57, after "domain", "coefficient" should read --coefficients--. Column 16, line 14, after "claim", "1" should read --6--; line 27, after "spectral", "vaue" should read --value--. Column 18, line 50, "that" should read --than--. Column 19, line 19, "reresenting" should read --representing--.

Signed and Sealed this

Twenty-second Day of March, 1988

Attest:

DONALD J. QUIGG

Attesting Officer

Commissioner of Patents and Trademarks